US008516099B1

United States Patent
Brusky et al.

(10) Patent No.: US 8,516,099 B1
(45) Date of Patent: Aug. 20, 2013

(54) SCALING MANAGEMENT TASKS PERFORMED BY A MANAGEMENT SYSTEM ACCORDING TO A DETERMINED SIZE OF A MANAGED ENVIRONMENT

(75) Inventors: Kevin J. Brusky, Houston, TX (US); Geoffery A. Schunicht, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 12/359,564

(22) Filed: Jan. 26, 2009

(51) Int. Cl.
*G06F 11/00* (2006.01)
(52) U.S. Cl.
USPC ............................. 709/223; 709/224; 718/102
(58) Field of Classification Search
USPC ....................... 709/223, 224; 718/1, 100, 102
See application file for complete search history.

(56) References Cited

U.S. PATENT DOCUMENTS

| 7,024,472 | B1 | 4/2006 | Datta et al. |
| 7,349,958 | B2 | 3/2008 | Chambliss et al. |
| 7,370,097 | B2 | 5/2008 | Hashimoto |
| 7,412,513 | B2 * | 8/2008 | Levanoni et al. ............. 709/225 |
| 7,804,943 | B2 * | 9/2010 | Bhattacharjee et al. . 379/112.02 |
| 7,890,620 | B2 * | 2/2011 | Masuda et al. ................. 709/224 |
| 2002/0116490 | A1 * | 8/2002 | Hogg et al. .................... 709/224 |
| 2005/0108398 | A1 * | 5/2005 | Levanoni et al. ............. 709/225 |
| 2006/0075406 | A1 | 4/2006 | Sinha |
| 2006/0277295 | A1 * | 12/2006 | Masuda et al. ................. 709/224 |
| 2008/0046894 | A1 * | 2/2008 | Bhattacharjee et al. ...... 718/105 |
| 2008/0066067 | A1 | 3/2008 | Stimpson et al. |
| 2008/0209023 | A1 | 8/2008 | Mazzitelli |
| 2008/0276238 | A1 * | 11/2008 | Levanoni et al. ............. 718/100 |

FOREIGN PATENT DOCUMENTS

| JP | 06197132 A | 7/1994 |
| WO | WO 94/19753 A1 | 9/1994 |

* cited by examiner

*Primary Examiner* — Kenneth R Coulter

(57) ABSTRACT

A computer-based management system performs management tasks with respect to a managed environment. The management system determines a size of the managed environment, and according to the determined size, scales at least one performance characteristic of the computer-based management system to modify resources for performing the management tasks with respect to managed devices in the managed environment.

18 Claims, 2 Drawing Sheets

SCALING MANAGEMENT TASKS PERFORMED BY A MANAGEMENT SYSTEM ACCORDING TO A DETERMINED SIZE OF A MANAGED ENVIRONMENT

BACKGROUND

Devices connected to a network are able to communicate with each other (such as by e-mail, text messaging, and so forth), and to access various resources on the network (such as storage devices, software applications, websites, and so forth). Often, a management system is provided in a network to perform management tasks with respect to the network as well as network devices connected to the network. As examples, management tasks include discovering new devices in the network, determining the health of the devices in the network, and identifying settings of the devices in the network.

Conventionally, management systems do not efficiently change their behavior to account for networks of different sizes. A typical management system may manage a network of 50 devices in the same manner as a network of 5000 devices, for example. The increased management workload associated with a larger network of devices may increase the burden on a management system. As a result, the management system may fall behind schedule or even crash, which may result in decreased performance of the network and increased failures experienced by users of network devices.

BRIEF DESCRIPTION OF THE DRAWINGS

Some embodiments of the invention are described, by way of example, with respect to the following figures.

DETAILED DESCRIPTION

Figure 1:
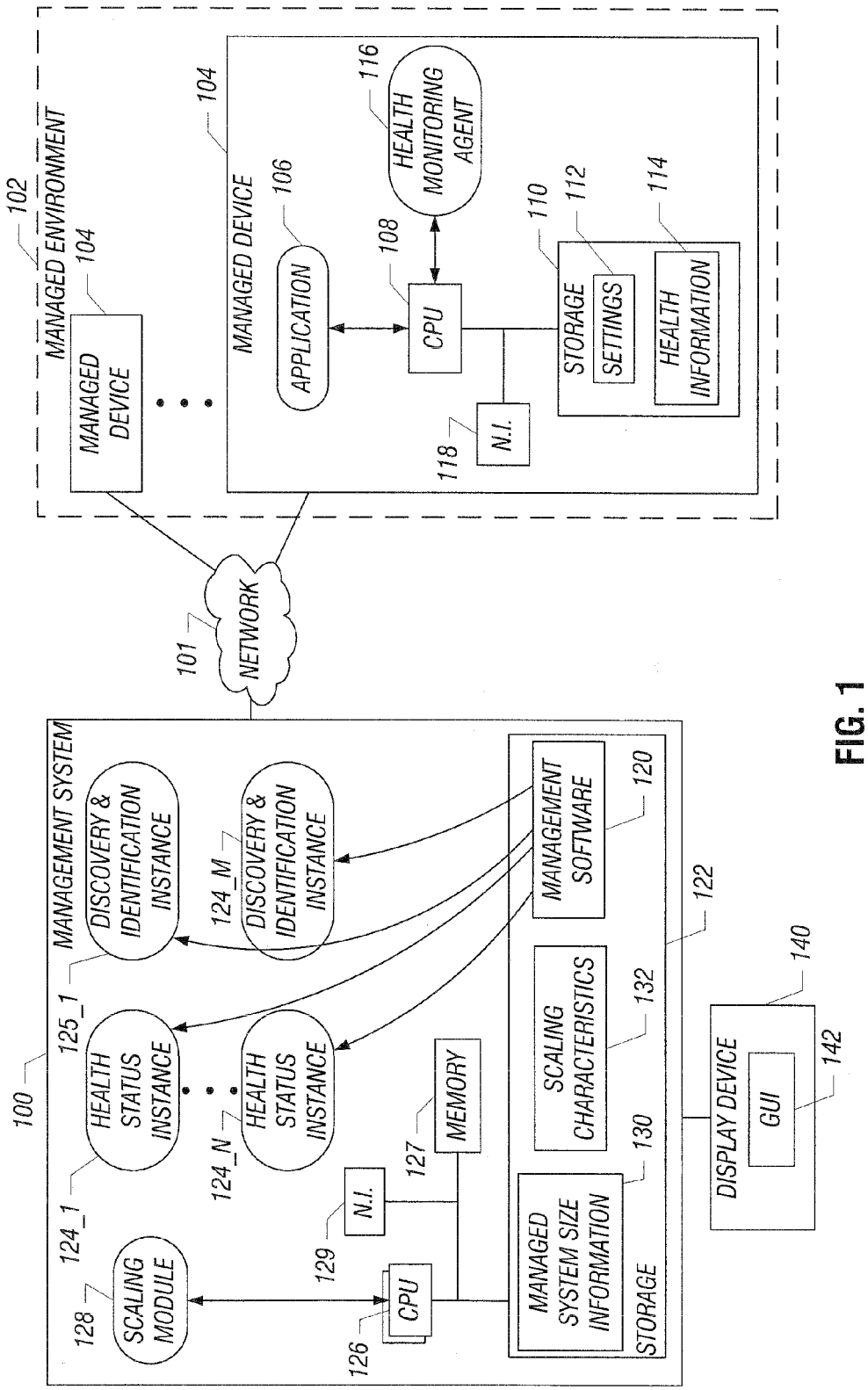
FIG. 1 is a block diagram of an exemplary arrangement that includes a management system according to an embodiment for managing devices in a managed environment.

In accordance with some embodiments, a technique or mechanism is provided to efficiently manage devices (referred to as "managed devices") that are connected to a network. The managed devices can be computer servers, storage servers, web servers, user computers, and so forth. A network can be a local area network (LAN), a wide area network (WAN), and/or another type of network. The term "network" to which managed devices are connected can refer to a single network or to a collection of multiple networks. The managed devices and the network together form a "managed environment."

Management tasks performed with respect to the managed environment by a management system can include one or more of the following: discovering new devices in the network; determining the health of the managed devices by receiving health information from the managed devices; and identifying settings of the managed devices. Health information is often reported by agents running on a managed device. These agents monitor the state of their respective portions (subsystems) of the managed device and track detected abnormalities (e.g., amount of available memory low, usage of disk storage has exceeded a threshold, etc.). The detected abnormalities can be categorized to different levels (e.g., normal, elevated, critical, etc.). The states of the subsystems can be combined to provide an overall managed device state.

Settings can include one or more of the following: hardware configuration (e.g., number of CPUs, types of CPU(s), amount of storage, etc.), software configuration (e.g., types of software applications loaded, versions of the software applications loaded, etc.), and/or other information.

In accordance with some embodiments, the management system can scale management tasks performed with respect to the managed environment according to a determined size of the managed environment. The "size" of the managed environment can be based on one or more of the following: a number of managed devices in the managed environment; a number of users using the managed devices; and/or a rate of events received from the managed devices by the management system.

"Scaling" the management tasks performed by the management system generally refers to modifying at least one performance characteristic of the management system. A "performance characteristic" of the management system refers to a feature of the management system that is dynamically adjustable to modify resources of the management system used to perform management tasks.

For example, modifying the performance characteristic can include changing (increasing or decreasing) a number of instances of management software in the management system that are executed to perform the management tasks. The management system is a computer-based management system that includes one or more computers in which instances of the management software are executable. The management system can spawn dynamically adjusted numbers of instances of the management software based on the size of the managed environment. In this first example, the resources that are modified according to the size of the managed environment include the number of management software instances that are spawned to perform a particular management task. An "instance" can refer to a thread or process.

Alternatively, or in addition, modifying the performance characteristic can include changing (increasing or decreasing) a frequency at which management tasks are performed (such as by changing the frequency of polling managed devices for health information or for settings, changing the frequency of performing discovery of managed devices, or changing the frequency of other management tasks such as data collection, performance statistics gathering, event management, and so forth). In this second example, the resources that are automatically and dynamically modified according to the size of the managed environment include the frequencies of management tasks.

In some implementations, upon modification of a performance characteristic, a user (or users) can be notified of the modification.

FIG. 1 illustrates an exemplary arrangement that includes a management system 100 that is coupled over a network 101 to managed devices 104 that are part of a managed environment 102. Although the management system 100 and managed environment 102 are depicted as being separate, note that in an alternative implementation the management system 100 can be part of the managed environment 102. Although multiple managed devices 104 are shown in the managed environment 102, it is noted that the managed environment 102 can include just one managed device 104 in an alternative implementation.

As depicted in FIG. 1, each managed device 104 includes a software application 106 executable on one or more central processing units (CPUs) 108, which in turn are connected to storage 110. The storage 110 can include both memory and persistent storage (e.g., disk-based storage).

As depicted in FIG. 1, settings 112 of each managed device 104 are stored in the storage 110. Settings can include one or more of the following: hardware configuration (e.g., number of CPUs, types of CPU(s), amount of storage, etc.), software configuration (e.g., types of software applications loaded, versions of the software applications loaded, etc.), and/or other information.

As further depicted in FIG. 1, each managed device 104 includes a health monitoring agent 116 executable on the CPU(s) 108. The health monitoring agent 116 can monitor various health-related characteristics of the managed device, such as whether CPU usage has exceeded a threshold, storage usage has exceeded a threshold, temperature violations have occurred, a number of faults have exceeded a threshold, certain types of errors have occurred, and so forth. The information collected by the health monitoring agent 116 is stored as health information 114 in the storage 110 of the managed device 104.

The settings 112 and health information 114 in the storage 110 of each managed device 104 is accessible by the management system 100. The management system 100 includes management software 120, which includes program code stored in a storage 122 (e.g., persistent storage) of the management system 100. The management software 120 includes code to perform health status determination of the managed devices 104, and code to perform discovery and identification of the managed devices 104 (for discovery new managed devices 104 and to determine settings of the managed devices 104).

The management system 100 is able to spawn multiple health status instances 124_1 to 124_N from the code to perform health status determination in the management software 120 (where N≧1). The management software instances 124_1 to 124_N are executable on one or more CPUs 126 of the management system 100. Also, the management system 100 is able to spawn multiple discovery and identification instances 125_1 to 125_M from the code to perform discovery and identification in the management software 120 (where M≧1, and where M can be the value as or different from N).

The CPU(s) 126 is (are) connected to the storage 122 and to memory 127 (which can be implemented with volatile memory such as dynamic random access memory, for example). The CPU(s) 126 is (are) also connected to a network interface 129 to allow the management system 100 to communicate over the network 101. Note that the management system 100 can be a distributed system implemented with multiple computers, or alternatively, the management system 100 can be implemented with a single computer.

During operation of a management software instance (health status instance 124_i or discovery and identification instance 125_j, where 1≦i≦N, and 1≦j≦M), the management software instance is able to access the managed devices 104 over the network 101 to obtain health information 114 or settings 112 stored in the storage 110 of the respective managed devices 104. The access of such information can be performed by the management software instance sending polling requests over the network 101 to respective managed devices 104. A health status instance 124_i sends health polling requests to the managed devices 104. In response to the health polling requests, the managed devices 104 send back corresponding health information 114. If there are multiple health status instances 124_i, each of the multiple health status instances 124_i is responsible for obtaining the health information of a respective subset of managed devices 104. Alternatively, in some implementations, each health status instance 124_i obtains health information of just one managed device 104 at a time, with the health status instance assigned to obtain the health information of another managed device by a workload manager (not shown).

A discovery and identification instance 125_j sends identification polling requests to the managed devices 104. In response to the identification polling requests, the managed devices 104 send back corresponding settings 112. If there are multiple discovery and identification instances 125_j, each of the multiple discovery and identification instances 125_j is responsible for obtaining the settings of a respective subset of managed devices 104.

Each discovery and identification instance 125_j is also able to perform a discovery operation to determine whether a new managed device 104 has been added to the managed environment 102. The discovery operation involves the discovery and identification instance 125_j searching a corresponding address range (e.g., Internet Protocol or IP address range) to find a new managed device 104.

In accordance with some embodiments, a scaling module 128 is provided in the management system 100. The scaling module 128 is executable on the CPU(s) 126 to determine a size of the managed environment 102. The size of the managed environment 102, as mentioned above, includes one or more of the following: a number of managed devices, a number of users using the managed devices, and a rate at which events are received from the managed devices 104, where events refer to alarms or other forms of information originated by the managed device 104 and sent to the management system 100. If the size of the management system 106 is based on more than one of the above parameters, then an aggregation (e.g., summing, averaging, etc.) can be performed by aggregating the values of the multiple parameters (e.g., summing the number of managed devices with the number of users).

Determining the size of the managed environment 102 is performed as part of the discovery operation. The managed environment's size is stored as managed environment size information 130 in the storage 122 of the management system 100. Based on the managed environment size information 130, the scaling module 128 can dynamically adjust scaling characteristics 132 (also stored in the storage 122) of management tasks performed by the management system 100. The scaling characteristics 132 can include, as examples, a number of instances of the management software 120, and/or the frequency at which management tasks are performed (e.g., the frequency of polling requests sent to the managed devices 104).

In one example, the size of the managed environment can be derived according to Table 1 below:

TABLE 1

| Number of Managed Devices | Size |
| --- | --- |
| 1-50 | Small |
| 51-500 | Medium |
| 501-1000 | Large |
| 1001+ | Very Large |

In the example above, there are four categories of sizes: small, medium, large, and very large, where the category is based on the number of managed devices. For example, if the number of managed devices is 1-50, then the size of the managed environment is indicated as "small." On the other hand, if the number of managed devices is in the range between 51 and 500, then the size is indicated as "medium." Based on the indicated size of the managed environment 102, the scaling characteristics 132 can be adjusted by the scaling module 128 accordingly. In alternative implementations, characterization of a size of the managed environment into discrete categories (as in Table 1 above) does not have to be performed; instead, the scaling module 128 can set the scaling characteristics 132 based directly on the actual number of managed devices 104. For example, the number of managed devices can be fed into a formula to specify the scaling characteristics 132.

As noted above, one of the management tasks performed by the health status instances 124_i is a health polling task. Health polling can be performed by sending Simple Network Management Protocol (SNMP) or Web-based Enterprise Management (WEBEM) requests to the managed devices, as examples. The number of health status instances 124_1 to 124_N that are spawned by the management system can be set according to the example below:

TABLE 2

| Size | Number (N) of Health Status Instances |
|---|---|
| Small | 5 |
| Medium | 10 |
| Large | 15 |
| Very Large | 30 |

Thus, a greater number of health status instances 124_1 to 124_N are spawned or created for a larger managed environment 102, while a smaller number of health status instances are spawned or created for a smaller managed environment 102.

In addition to dynamically varying the number of health status instances 124_1 to 124_N, the scaling module 128 can also vary the frequency at which health polling requests are sent, such as according to Table 3 below:

TABLE 3

| Size | Health Polling Frequency Setting (minutes) |
|---|---|
| Small | 5 |
| Medium | 10 |
| Large | 15 |
| Very Large | 30 |

In Table 3 above, if the managed environment is small, then the health polling frequency setting is set at five minutes, which means that polling requests are sent by each health status instance 124_i every five minutes. On the other hand, as the size of the managed environment increases, the health polling frequency is decreased (the intervals at which health polling requests are sent are increased).

The number of discovery and identification instances 125_1 to 125_M can also be varied based on the determined size of the managed environment 102. In some example cases, the discovery and identification instances 125_1 to 125_M send identification polling requests at much lower frequencies than health polling requests.

Figure 2:
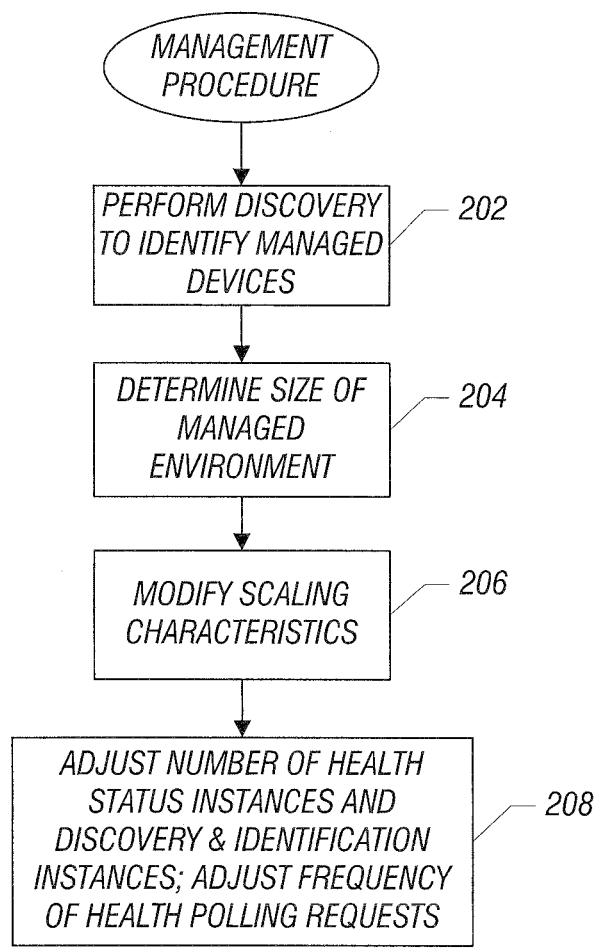
FIG. 2 is a flow diagram of a process of managing devices of a managed environment, according to an embodiment.

A management procedure according to some embodiments is depicted in FIG. 2. Initially, it can be assumed that a default number of health status instances 124_1 to 124_N and discovery and identification instances 125_1 to 125_M can be spawned in the management system 100. For example, initially, there can be just one health status instance and one discovery and identification instance.

The discovery and identification instances 125_1 to 125_M are used to perform (at 202) a discovery operation to identify the managed devices (including new managed devices) that are part of the managed environment. The discovery operation involves searching an IP address range(s) on the network 102. For example, each discovery and identification instance 125_i can send ping messages in the respective IP address range to obtain responses from the pinged network devices 104. The discovery and identification instance 125_i tracks the number of responses. In addition, the discovery and identification instance 125_i also determines whether a response has been obtained from a network device that the discovery and identification instance 125_i was not previously aware of.

Based on the discovery operation, the scaling module 128 is able to determine (at 204) the size of the managed environment 102. Based on the determined size of the managed environment, the scaling module 128 adjusts the scaling characteristics 132 (FIG. 1). The modification of the scaling characteristics 132 can be performed automatically by the scaling module 128 based on a predefined algorithm. Alternatively, the scaling module 128 can present the size information to a human administrator, such as by presenting the size information in a display device 140 (FIG. 1). The mechanism for notifying an administrator of the changed size information can be performed by any one or more of the following: sending an electronic mail, logging an event or message into a log file that will be later monitored by an administrator, or popping up a graphical user interface.

The display device 140 can present a graphical user interface (GUI) 142 having user control elements to allow the administrator to specify how the scaling characteristics 132 are to be adjusted. The manually-entered information is then provided to the management system 100 for modifying the scaling characteristics 132.

Based on the modified scaling characteristics, the number of the health status instances 124_1 to 124_N and discovery and identification instances 125_1 to 125_M are adjusted (at 208), if appropriate. Also, the frequency of health polling requests can be adjusted. In other embodiments, other performance characteristics can be adjusted based on the modified scaling characteristics.

A further feature according to some embodiments is the ability to change allocated portions of the memory 127 for the health status instances 124_1 to 124_N and the discovery and identification instances 125_1 to 125_M in the management system 100. For example, if the scaling module 128 determines that the amount of memory 127 of the management system 100 used by the health status instances 124_1 to 124_N exceeds a particular threshold, then the amount of memory 127 allocated to the health status instances 124_1 to 124_N can be increased. Similarly, if the scaling module 128 determines that the amount of memory 127 of the management system 100 used by the discovery and identification instances 125_1 to 125_M exceeds a particular threshold, then the amount of memory 127 allocated to the discovery and identification instances 125_1 to 125_M can be increased. Also, the amount of allocated memory can be decreased, such as due to memory usage reaching a predefined peak.

Instructions of software described above (including the scaling module 128, health status instances 124_1 to 124_N, and discovery and identification instances 125_1 to 125_M of FIG. 1) are loaded for execution on a processor (such as one or more CPUs 126 in FIG. 1). The processor includes microprocessors, microcontrollers, processor modules or subsystems (including one or more microprocessors or microcontrollers), or other control or computing devices. A "processor" can refer to a single component or to plural components (e.g., single CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a management system to perform management tasks with respect to a managed environment, comprising:
    determining, by the management system having a processor, a size of the managed environment that is one or more of: a number of managed devices in the managed environment; and a number of users using the managed environment; and
    scaling, by the management system according to the determined size, at least one performance characteristic of the management system to modify resources for performing the management tasks with respect to the managed devices in the managed environment, wherein scaling the at least one performance characteristic of the management system comprises increasing a number of instances of management software executed by the management system in response to the determined size increasing, the instances of the management software to perform the management tasks and executed in the management system that is separate from the managed devices,
    wherein increasing the number of instances of the management software comprises using a first number of instances of the management software for a first determined size of the managed environment, using a second number of instances of the management software for a second determined size of the managed environment, and using a third number of instances of the management software for a third determined size of the managed environment, where the third determined size is larger than the second determined size, and the second determined size is larger than the first determined size.

2. The method of claim 1, wherein scaling the at least one performance characteristic of the management system further comprises changing a frequency at which the management tasks are performed.

3. The method of claim 1, wherein scaling the at least one performance characteristic of the management system further comprises changing a frequency of polling the managed devices to determine information associated with the managed devices.

4. The method of claim 3, wherein changing the frequency of polling the managed devices to determine information associated with the managed devices comprises changing the frequency of polling the managed devices to obtain health information of the managed devices.

5. The method of claim 1, further comprising:
    the instances of the management software performing management tasks with respect to corresponding different subsets of the managed devices.

6. The method of claim 1, further comprising:
    the instances of the management software obtaining health information of corresponding different subsets of the managed devices.

7. The method of claim 6, wherein the health information is selected from the group consisting of a CPU usage exceeding a threshold, a storage usage exceeding a threshold, a temperature violation occurring, a number of faults exceeding a threshold, and an error occurring.

8. The method of claim 1, further comprising:
    the instances of the management software obtaining settings of corresponding different managed devices.

9. The method of claim 1, further comprising:
    the instances of the management software discovering managed devices connected to a network by searching respective address ranges on the network.

10. The method of claim 1, wherein the instances of the management software are distinct from monitoring agents executing in the managed devices.

11. A management system to perform management tasks with respect to a managed environment, comprising:
    a storage to store management software; and
    at least one processor to:
        execute the management software to perform the management tasks;
        determine a size of the managed environment that is one or more of: a number of managed devices in the managed environment; and a number of users using the managed environment; and
        according to the determined size of the managed environment, dynamically modify at least one characteristic of the management software, wherein the modified characteristic of the management software includes a number of instances of the management software that are spawned to perform the management tasks, the number of instances increasing in response to the determined size increasing, wherein the instances of the management software are executable by the management system that is separate from the managed devices,
    wherein the processor is to use a first number of instances of the management software for a first determined size of the managed environment, use a second number of instances of the management software for a second determined size of the managed environment, and use a third number of instances of the management software for a third determined size of the managed environment, where the third determined size is larger than the second determined size, and the second determined size is larger than the first determined size.

12. The management system of claim 11, wherein the modified characteristic of the management software further includes a frequency of polling the managed devices in the managed environment to obtain health information of the managed devices.

13. The management system of claim 11, further comprising a memory having a portion allocated to the management software, wherein the processor is to further modify an amount of the portion of the memory allocated to the management software based on detecting usage of the memory by the management software.

14. The management system of claim 11, wherein the instances of the management software are distinct from monitoring agents executing in the managed devices.

15. An article comprising at least one non-transitory computer-readable storage medium containing instructions that when executed cause a computer-based management system to:
   determine a size of a managed environment that is a number of users using the managed environment; and
   modify, according to the determined size, at least one characteristic of management software of the computer-based management system, wherein the management software is to perform management tasks with respect to managed devices in the managed environment, wherein the modified characteristic of the management software includes a number of instances of the management software that are spawned to perform the management tasks, the number of instances increasing in response to the determined size increasing,
   wherein increasing the number of instances of the management software comprises using a first number of instances of the management software for a first determined size of the managed environment, using a second number of instances of the management software for a second determined size of the managed environment, and using a third number of instances of the management software for a third determined size of the managed environment, where the third determined size is larger than the second determined size, and the second determined size is larger than the first determined size.

16. The article of claim 15, wherein the modified characteristic of the management software further includes a frequency of polling the managed devices in the managed environment to obtain health information of the managed devices.

17. The article of claim 15, wherein the instances of the management software are executable in the management system that is separate from the managed devices in the managed environment.

18. The article of claim 17, wherein the instances of the management software are distinct from monitoring agents executing in the managed devices.

* * * * *